United States Patent
Johnson et al.

(10) Patent No.: US 12,039,610 B1
(45) Date of Patent: Jul. 16, 2024

(54) METHODS FOR ADJUSTING GIG DEVELOPER INSURANCE PREMIUMS

(71) Applicant: United Services Automobile Association (USAA), San Antonio, TX (US)

(72) Inventors: Caleb Ezekiel Johnson, Plano, TX (US); Ric M. Pena, Boerne, TX (US); Oscar Guerra, San Antonio, TX (US); Sumita T. Jonak, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/747,442

(22) Filed: May 18, 2022

Related U.S. Application Data

(60) Provisional application No. 63/192,904, filed on May 25, 2021.

(51) Int. Cl.
*G06Q 40/08* (2012.01)
*G06F 16/93* (2019.01)
*G06F 40/134* (2020.01)
*G06Q 10/0635* (2023.01)
*G06Q 10/10* (2023.01)

(52) U.S. Cl.
CPC .......... *G06Q 40/08* (2013.01); *G06F 16/94* (2019.01); *G06F 40/134* (2020.01); *G06Q 10/0635* (2013.01); *G06Q 10/10* (2013.01)

(58) Field of Classification Search
CPC .... G06Q 40/08; G06Q 10/0635; G06Q 10/10; G06F 16/94; G06F 40/134
USPC ...................................................... 705/3-44
See application file for complete search history.

(56) References Cited

U.S. PATENT DOCUMENTS

| 6,505,318 B1 * | 1/2003 | Quach ................. G06F 11/1008 714/753 |
| 7,137,043 B1 * | 11/2006 | Kane .................... G06F 11/0709 714/57 |
| 11,436,529 B1 * | 9/2022 | Londeree .............. G06F 16/353 |

(Continued)

FOREIGN PATENT DOCUMENTS

DE 102018003142 A1 * 6/2019 .......... G06F 11/3604

OTHER PUBLICATIONS

Ghodoosi, "Contracting in the age of Smart Contracts", Washington Law Review 96.1:51-92m Washington Law Review Association, ISSN 00430617 (Year: 2021).*

*Primary Examiner* — Frantzy Poinvil
(74) *Attorney, Agent, or Firm* — Fletcher Yoder, P.C.

(57) ABSTRACT

A method may include receiving, via a processor, an indication that a user is performing one or more activities on a project code. The method may then involve receiving an insurance policy associated with the user and the project code in response to receiving the indication, monitoring the one or more activities performed on the project code by the user, and determining whether the one or more activities correspond to one or more expected activities associated with the insurance policy. The method may also include sending a notification indicative of one or more inconsistent activities to a user device in response to the one or more activities not corresponding to the one or more expected activities.

20 Claims, 3 Drawing Sheets

(56) References Cited

U.S. PATENT DOCUMENTS

| | | | |
|---|---|---|---|
| 2010/0082367 A1* | 4/2010 | Hains | G16H 20/10 |
| | | | 705/2 |
| 2010/0228561 A1* | 9/2010 | Boyce | G06Q 30/02 |
| | | | 707/E17.107 |
| 2014/0279799 A1* | 9/2014 | Thomas | G06Q 30/0215 |
| | | | 706/55 |
| 2016/0224752 A1* | 8/2016 | Van Wyck | H04L 65/611 |
| 2023/0004263 A1* | 1/2023 | Morrison | G06F 3/0482 |

\* cited by examiner

METHODS FOR ADJUSTING GIG DEVELOPER INSURANCE PREMIUMS

CROSS-REFERENCE TO RELATED APPLICATION

This application claims priority to and the benefit of U.S. Provisional Application No. 63/192,904 entitled "Methods for Adjusting Gig Developer Insurance Premiums," filed May 25, 2021, which is hereby incorporated by reference in its entirety for all purposes.

BACKGROUND

This section is intended to introduce the reader to various aspects of art that may be related to various aspects of the present techniques, which are described and claimed below. This discussion is believed to be helpful in providing the reader with background information to facilitate a better understanding of the various aspects of the present disclosure. Accordingly, it should be noted that these statements are to be read in this light, and not as admissions of prior art.

The expansion of independent contract, temporary, or gig-based industries has created a large number of employment opportunities for these contract or gig workers in various sectors of the global economy. In some cases, gig workers include a class of software developers who may perform software-related or coding tasks for companies. As these gig developers work on various corporate projects as independent contractors, it may be beneficial to develop processes for detecting gig-related work performed by these gig developers and providing insurance products and services to these gig developers.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method may include receiving, via a processor, an indication that a user is performing one or more activities on a project code. The method may then involve receiving an insurance policy associated with the user and the project code in response to receiving the indication, monitoring the one or more activities performed on the project code by the user, and determining whether the one or more activities correspond to one or more expected activities associated with the insurance policy. The method may also include sending a notification indicative of one or more inconsistent activities to a user device in response to the one or more activities not corresponding to the one or more expected activities.

In another embodiment, a method may include monitoring, via a processor, one or more activities performed on one or more portions of a project code by a user. The method may also involve determining whether the one or more activities affect one or more other portions different from the one or more portions of the project code, sending a notification indicative of request for a liability break for the or more activities to a user device in response to determining that the one or more activities affect one or more other portions of the project code, and modifying one or more visualizations associated with the one or more portions to include information related to the liability break In yet another embodiment, a non-transitory computer-readable medium may include computer-executable instructions that, when executed, are configured to cause at least one processor to perform operations that may include receiving an indication that a user is performing one or more activities on a project code. The operations may also involve receiving an insurance policy associated with the user and the project code in response to receiving the indication, monitoring the one or more activities performed on the project code by the user, and determining whether the one or more activities correspond to one or more expected activities associated with the insurance policy. The operations may also include sending a notification indicative of one or more inconsistent activities to a user device in response to the one or more activities not corresponding to the one or more expected activities.

Various refinements of the features noted above may exist in relation to various aspects of the present disclosure. Further features may also be incorporated in these various aspects. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
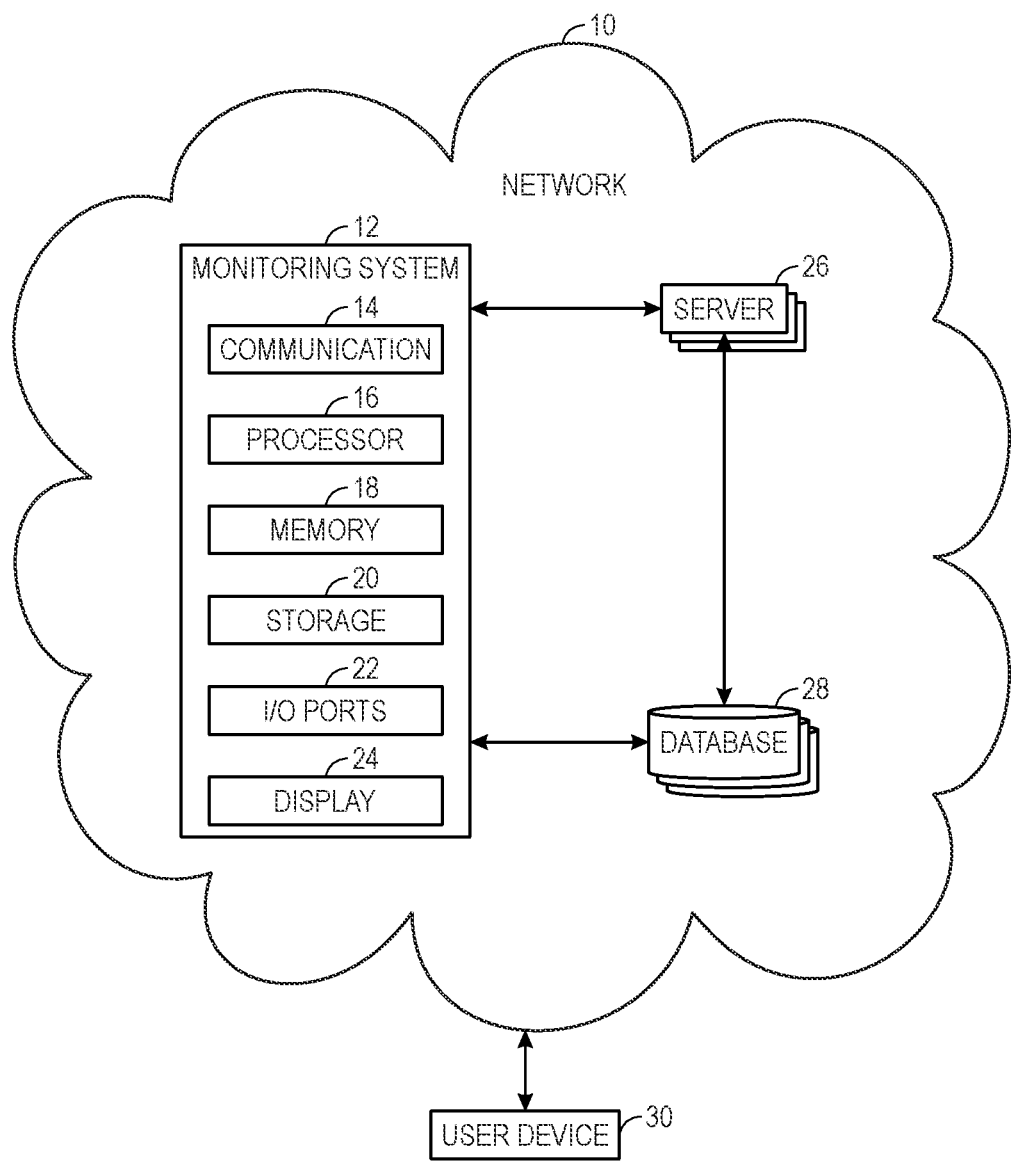
FIG. 1 illustrates a block diagram of a system for monitoring gig-related projects via a monitoring system, in accordance with an embodiment described herein.

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Gig workers—that is, independent contractors, online platform workers, contract firm workers, on-call workers, temporary workers, and the like—are emerging as a larger and more prevalent component of the global economy. An increasing number of companies are beginning to employ more gig workers for various corporate projects. For example, a company may employ a number of gig-based developers to work on one or more corporate projects.

These gig developers may benefit from liability protection for the work they perform on a corporate project. That is, gig developers may desire protection or liability coverage in the event that their work on project results in a liability issue (e.g., financial, security). For instance, software projects may use different portions of code provided by different software developers to perform different tasks. If one of the code portions is defective or incorrectly performs certain analysis operations, the resulting data outputs may cause other portions of the code or application to produce incorrect results or perform operations in an unexpected manner. As such, insurance that provides liability protection for portions of code or software application produced by gig developers may be useful to cover costs associated with errors produced by the software.

Keeping this in mind, in certain embodiments, a monitor system may track software projects, code, and other activities being performed by a gig developer. The monitor system may evaluate the activity of a gig developer to determine if the gig developer is within the bounds of expected activities associated with a related insurance policy. In some embodiments, the monitor system may compare the user's actions related to a software project to expected operations and adjust the gig developer's premium based on the activity. That is, if the gig developer's activity does not match expected operations, the monitor system may provide an error visualization or modify (e.g., increase) a premium amount attributed to the user.

In another embodiment, the monitor system may determine if a gig developer's portions of a software project may create a liability issue for other portions of the software project due to dependencies between the gig developer's portions of the software project to other portions of the software project. Here, the monitor system may detect the dependency issues and provide an indication to the gig developer to insert notifications or comments with the respective software code to indicate locations or pointers in software in which the gig developer may be absolved of liability. These locations may be stored in a digital representation of the insurance policy for the gig developer for the respective software project.

With the foregoing in mind, providing or adjusting insurance premiums based on a dynamic evaluation of a gig developer's produced code may thus enable both gig developers and insurance companies to provide improved insurance coverage while minimizing costs. Moreover, the embodiments described herein may automatically detect and identify software code and projects being developed by a gig developer and provide visualizations for the gig developer to notify them of a potential liability, an opportunity to secure liability coverage, a change in a liability or premium amount, and the like. Additional details regarding systems and processes for adjusting a gig developer's insurance premium will be discussed below in reference to FIGS. 1-3.

Present embodiments described herein may utilize a monitoring system to dynamically adjust a premium cost for a gig developer working on a project. That is, in some embodiments the monitoring system may interact with various devices via a network to determine whether a user (e.g., a gig developer) is within bounds of their insurance coverage. In other embodiments, the monitoring system may interact with various devices via a network to determine if a user is eligible to request a liability break for the project.

By way of introduction, FIG. 1 illustrates a system for transmitting and adjusting gig developer insurance premiums via a monitoring system 12 in accordance with certain embodiments disclosed herein. The monitoring system 12 may use data to analyze user activity while working a software development environment and may adjust the user's premium cost based on the manner in which the user performs certain tasks. Devices, such as a user device 30, may provide the data to the monitoring system 12 via a network 10. This data may describe activities pertaining to a user's activities in relation to a project (e.g., produced code). Additionally, a database 28 may provide user information to the monitoring system 12. The user information may detail the user's level of expertise (e.g., years of experience, known programming languages, etc.), education and certifications, role in the project, role in the company (e.g., junior or senior engineer), efficiency related to other, similar projects (e.g., expected amount of time to complete a similar project), and the like. After receiving the data, the monitoring system 12 may monitor the actions or operations (e.g., coding tasks) performed by the user on a particular project and compare the actions with the data collected from the user device 30, the database 28, or any other suitable device to determine if the user's actions are consistent with acceptable or expected actions specified in a policy for providing liability insurance coverage related to the user's actions. That is, the monitoring system 12 may use details about the user's activities (e.g., type of project, time spent on project, inserted comments, etc.) to determine if the user' actions are consistent with their insurance coverage. After determining that the user's actions correspond to unexpected actions, the monitoring system 12 may adjust the user's insurance premium to reflect the increased exposure of liability risk undertaken by the liability coverage provider. Additional details with regard to monitoring the user's actions while performing a software-oriented task with respect to an existing liability coverage policy will be discussed below with reference to FIG. 2.

Turning to the components of FIG. 1, the monitoring system 12 may be implemented using a suitable computer device (e.g., general-purpose personal computer, a laptop computer, a tablet computer, a mobile computer) that may execute specialized or specific executable-instructions that cause the computing device to perform the various tasks described herein. The monitoring system 12 may include a communication component 14, a processor 16, a memory 18, a storage 20, input/output (I/O) ports 22, a display 24, and the like. The communication component 14 may be a wireless or wired communication component that may facilitate communication between the monitoring system 12 and various other computing systems via a network 10 (e.g., the Internet) or the like.

The processor 16 may be any type of computer processor or microprocessor capable of executing computer-executable code. The processor 16 may also include multiple processors that may perform the operations described below. The memory 18 and the storage 20 may be any suitable articles of manufacture that can serve as media to store processor-executable code, data, or the like. These articles of manufacture may represent computer-readable media (e.g., any suitable form of memory or storage) that may store the processor-executable code used by the processor 16 to perform the presently disclosed techniques. The memory 18 and the storage 20 may store data, various other software applications for analyzing the data, and the like. The memory 18 and the storage 20 may represent non-transitory computer-readable media (e.g., any suitable form of memory or storage) that may store the processor-executable code used by the processor 16 to perform various techniques described herein. It should be noted that non-transitory merely indicates that the media is tangible and not a signal.

The I/O ports 22 may be interfaces that may couple to other peripheral components such as input devices (e.g., keyboard, mouse), sensors, input/output (I/O) modules, and the like. The display 24 may operate as a human machine interface (HMI) to depict visualizations associated with software or executable code being processed by the processor 16. In one embodiment, the display 24 may be a touch display capable of receiving inputs from a user of the monitoring system 12. The display 24 may be any suitable type of display, such as a liquid crystal display (LCD), plasma display, or an organic light emitting diode (OLED) display, for example. Additionally, in one embodiment, the display 24 may be provided in conjunction with a touch-sensitive mechanism (e.g., a touch screen) that may function as part of a control interface for the monitoring system 12.

It should be noted that the components described above with regard to the monitoring system 12 are examples and the monitoring system 12 may include additional or fewer components relative to the illustrated embodiment. Additionally, the components listed as being part of the monitoring system 12 may also be components that are part of other computing devices described below.

In certain embodiments, the monitoring system 12 may be connected to a network 10, which may include one or more collections of computing systems, the Internet, an Intranet system, or the like. The network 10 may facilitate communications between the monitoring system 12, server 26, database 28, user device 30, and the like. The network 10 may use various communication protocols to facilitate the communications. The communications protocols may include Open Database Connectivity (ODBC), TCP/IP Protocol, Distributed Relational Database Architecture (DRDA) protocol, Database Change Protocol (DCP), HTTP protocol, other suitable current or future protocols, or the like.

Referring again to FIG. 1, the user device 30 may be an electronic device that enables a user to work on a project. For example, the user device 30 may be a computing system such as a desktop computer, a laptop computer, an implanted computer, and the like. The user device 30 may have access to the network 10 directly (e.g., through a specific virtual private network (VPN) connection) or indirectly (e.g., via a public network and with certain security protocols). During access to a service provided by an organization via the network 10, personal data—such as name, address, phone number, email address, age, and social security number—associated with the user of the user device 30 may be utilized (i.e., recorded, verified, processed, analyzed, modified, and modeled) by the organization using a server 26.

The server 26 may be a server operated by a third-party organization (e.g., webhost that provides a service that may present private data, such as a bank, an insurance company, or a financial group). For example, the server 26 may be a private server, such as one connected to a local area network (LAN) that includes a variety of computing and server devices including but not limited to, switches, servers (e.g., processors), storage (e.g., memory), and routers, each of which is inaccessible to remote devices outside the LAN. The server 26 may include restrictions and access rules established to relegate access to selected users (e.g., clients, employees, third-party service providers, regulatory representatives). The organization may use the server 26 to provide a variety of services for the clients. In some embodiments, the server 26 may be offsite (e.g., in a cloud network or the like). The server 26 may include service/application servers, data servers, databases, and other server devices such as gateways, switches, and routers.

In some embodiments, the server 26 may be communicatively coupled to one or more databases 28, or any other suitable storage devices, which may store user data. The user data may contain data pertaining to a user, such as personal information, account information, banking information, insurance data, and the like. The user data may be stored in various file formats, such as HTML, plain text, widely-used proprietary formats (e.g., Microsoft™ Word or Microsoft™ Excel), PDF, XML, Rich Text Format, Open Document Text, and the like.

The monitoring system 12 may receive information pertaining to the user's activities via inputs provided through the I/O ports 22, the user device 30 via the network 10, the database 28, or any other sources. The monitoring system 12 may utilize the received information to determine if a user's activities is consistent with their insurance policy, and the monitoring system 12 may adjust and update the user's insurance policy in accordance with the embodiments described below. That is, the monitoring system 12 may track the user's activities while performing tasks in a software platform. The activities may include writing code, validating portions of code, testing functionalities of the software, and the like. The monitoring system 12 may detect the activities (e.g., typing, time) and compare the activities with expected behavior or actions for the same or similar tasks. Based on the user's performance, the monitoring system 12 may send notifications warning the user of his errors, adjust an insurance premium associated with the user's activities, or the like.

Figure 2:
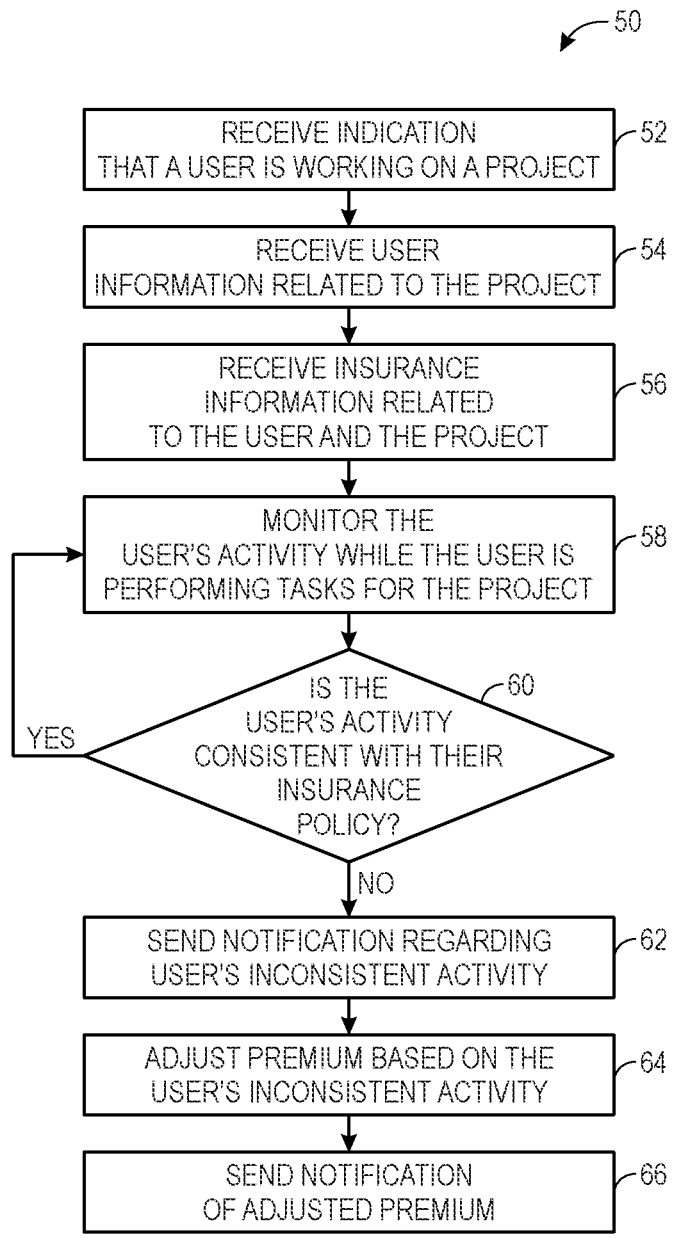
FIG. 2 illustrates a flow chart of a process for monitoring a user's activity on a project and adjusting a premium for the user based on the user's activity, in accordance with an embodiment described herein.

With the foregoing in mind, FIG. 2 illustrates a flow chart of a process 50 for adjusting an insurance premium of a user's insurance policy based on the user's activity on a project. Although the process 50 is described in a particular order, it should be noted that the process 50 may be performed in any suitable order and is not limited to the order presented herein. It should also be noted that although each block is described below in the process 50 as being performed by the monitoring system 12, other suitable computing systems may perform the processes described herein. Indeed, in some embodiments, monitoring system 12 may be incorporated or implemented via the user device 30 as the user performs tasks in real time.

Referring now to FIG. 2, at block 52, the monitoring system 12 may receive an indication that a user is working on a project. As such, the monitoring system 12 may have access to the user device 30 and may monitor the processes and/or applications being executed via the user's device 30. In some embodiments, the user may be a gig developer that performs certain software tasks on a per job or contract basis for an organization (e.g., as a customer of the organization). In some embodiments, the software tasks may include a project, such as a software development project that may be part of a collection of software components or projects that the organization may use to perform certain analysis operations or services. For example, an organization may commission different gig developers to create different software modules or portions that make up one software tool. The software portions may be related to user interface functions to allow inputs to be received via I/O ports 22, security functions that provide authentication and password services, data retrieval services that translate received inputs into queries, and the like.

In some embodiments, the user device 30 may provide the indication to the monitoring system 12. The indication may be associated with information or data that may pertain to the user's activities on the user device 30, such as a list of files that the user accesses, an indication that an integrated development environment (IDE) is currently being used, an indication that the user is typing software or processor-executable code, an indication of a software development or coding application being executed, an indication that a secure connection is active with the server 26, an indication that a multi-factor authentication tool was used, and the like. Moreover, the data may detail external factors related to the user's activities, such as a time that the user is performing his activities, the location of the user device 30, a wireless router accessed by the user device 30, an IP address of the user device 30, security software employed by the user device 30, and the like. Additionally, the data may indicate a type of project that the user is currently preparing. For example, the project may be an artificial intelligence (AI) project (e.g., autonomous vehicle control, robot-assisted surgery, etc.). In another example, the project may be a financial project (e.g., investing algorithm, tax software, etc.) that may manage financial tasks associated with a person.

In some embodiments, the monitoring system 12 may query a register or other suitable component of the user device 30 to retrieve data related to the user performing an activity or working on a software-oriented task. In response to receiving the query, the user device 30 may provide the indication to the monitoring system 12 related to the current tasks or applications being executed by the processor of the user device 30 or the like.

In addition to receiving the indication that the user is working on a project, the monitoring system 12 may receive user information related to the project at block 54. The user information may be procured from the database 28 or any other suitable storage device. The user information may contain information such as: the user's level of expertise (e.g., years of experience, known programming languages, etc.), educational background and certifications, role in the project, role in the company (e.g., junior or senior engineer), experience with respect to similar projects (e.g., time usually spent by user to complete a project).

Likewise, at block 56, the monitor system 12 may receive insurance policy information pertaining to the user, the project, or both. The monitor system 12 may retrieve this insurance policy information from the database 28 or any other suitable storage device. The insurance policy information may include parameters or guidelines that the user is expected to follow when performing the software development tasks. The parameters may be related to writing code, testing software, or the like.

In some embodiments, the parameters may correspond to a software development guide or protocol established by the client that the user supports. By way of example, the parameters may include ensuring that any commented portion of source code or a project's code corresponds to comments, as opposed to independent code. That is, the monitor system 12 may review the commented portions of code and determine whether the commented portion include executable instructions. Developers occasionally generate code that may be used in the future. However, these codes may rarely, if ever, be used and can cause confusion for other developers.

The parameters may also include guidelines that restrict the user to portions of the software that he develops. That is, the monitor system 12 may detect whether the user is accessing or modifying different code portions that are not assigned to him or his part of his project.

The parameters may also include specifying an amount of time in which the user or developer addresses or reviews an erroneous portion of his developed code. That is, the monitor system 12 may initiate a timer after a code portion is executed or tested for operation. The parameters may include a time limit or duration of time that it monitors whether the developer addresses the detected error. Detected errors are more likely to be resolved if attended to soon after detected.

The parameters may also include ensuring that each portion of the developed software or code is tested. Indeed, as developers generate code, the code should be tested and verified to ensure that they operate as expected and do not create problems or issues in other portions of the software unrelated to the user's project.

The parameters may also include ensuring that portions of code are not repeated unnecessarily. That is, the monitor system 12 may identify portions of code that are repeated and determine if such repetition is redundant. For example, a variable that is defined multiple times to the same certain value or a subroutine that contains the same code as another subroutine may be determined as redundant. Indeed, repeated variables or subroutines may reduce performance and cause confusion for other developers.

The parameters may also include ensuring that subroutines do not exceed a certain length. Overly lengthy functions may unnecessarily reduce performance and cause confusion for other developers.

After receiving information at blocks 54 and 56, at block 58, the monitor system 12 may monitor the user's activities while she performs tasks for the project. In an embodiment, the monitor system 12 may receive data from the user device 30 as the user inputs data, commands, functions, and the like. The data may detail factors pertaining to the user's activities on the user device 30 in relation to the project and the insurance policy information related to expected behavior by the user. For example, the monitor system 12 may receive peripheral data such as typing, clicking, and other input data to monitor the applications employed by the user, the software code entered by the user, the tasks performed by the user, and the like. This data may detect whether the user is interacting with the project (e.g., typing code, editing files, etc.) and the activities performed by the user. In another example, the monitor system 12 may receive data relating to memory changes, which may indicate that a user is updating variables in project code, a user is editing files, a user is saving files, and the like.

At block 60, the monitor system 12 may determine if the user's actions are consistent with the coverage of their insurance policy. That is, the monitor system 12 may determine whether the user is operating within the guidelines or expected behavior parameters specified in the insurance policy information described above. In some embodiments, the monitor system 12 may make this determination by analyzing one or more relationships between the retrieved user information, insurance information, user actions, or the like. That is, the user's compliance may be evaluated on factors such as: if the proper number of comments are made on the code, the user has the proper certifications and education for the work they are performing, if the user is within the time limits of their insurance policy, and the like. In some embodiments, the monitor system 12 may wait for a certain amount of time before determining if a user's actions are within the expected behavior parameters. For example, if the insurance policy information specifies that the user make a comment for each subroutine (e.g., function) that the user produces, the monitor system 12 may detect whether the user is out of compliance a certain amount of time after the user inputs the respective code. In this way, the monitor system 12 may avoid unnecessarily flagging inconsistent activity for cases in which the user does not immediately provide compliance. Furthermore, the monitor system 12 may consider other external factors to determine the user's compliance. For instance, such factors may include: the type of user device 30 (e.g., personal computer vs. business computer), usage of a virtual private network (VPN), and the like. If the monitor system 12 determines that the user is compliant with their insurance policy, the monitor system 12 may return to monitoring the user's actions (block 58).

On the other hand, if the monitor system 12 determines that the user is not compliant with their insurance policy, the monitor system 12 may proceed to block 62. At block 62, the monitor system 12 may send a notification regarding the user's inconsistent action to the user device 30. In some embodiments, the notification may be presented via a display on the user device 30 or within the software development application. The notification may provide information related to the violated constraint, such as an indication that the project may not be covered under the existing policy, an indication that costs may be involved to maintain coverage, and the like. In some embodiments, the notification may detail activities that the user may perform to comply with their insurance policy again. The notification may also include an interactive link that may direct the user device 30 to the portion of the project that corresponds to the compliance issue. In addition, the notification may include one or more suggestions for changing the project to conform with the compliance standards. In some embodiments, the suggestions may be determined based on a machine learning or artificial intelligence algorithm or program that monitors other users' projects and stores changes made by the users to make their projects compliant.

In some embodiments, the user may perform the activities detailed in the notification in order to reenter compliance with their insurance policy. In some embodiments, the monitor system 12 may initiate a timer upon the user acknowledging the notification (e.g., via a user input), which sets a time limit or duration for the user to perform the activities. If the user performs the activities within the time limit or duration, the user device 30 may provide an indication to the monitor system 12. Upon receiving the indication, the monitor system 12 may send a notification regarding the user's compliance to the user device 30. In some embodiments, the notification may be presented via a display on the user device 30 or within the software development application. The monitor system 12 may then return to monitoring the user's actions (block 58).

At block 64, the monitor system 12 may adjust the user's insurance premium based on the user's inconsistent activity. That is, the monitor system 12 may determine the magnitude or an increase of premium adjustment based on the user's inconsistent activity. The monitor system 12 may make this determination based on an analysis that weighs the inconsistent activity, the user's information, the insurance information, or the like. In some embodiments, the monitor system 12 may determine and apply a percentage increase of the user's premium based on the analysis. The monitor system 12 may store the adjusted premium in the database 28 or any other suitable device. After adjusting the user's updated insurance premium, the monitor system 12 may send a notification of the adjusted premium to the user device 30 as described above (block 66). It should be noted that, in some embodiments, if the user corrects issues presented in the notification provided at block 62, the monitor system 12 may return to block 58 and monitor the user's activity instead or proceeding to block 64.

As discussed above, the monitor system 12 may monitor a user's activity in relation to a project. The monitor system 12 may analyze the user's activity to determine if the user activity is consistent with the user's insurance policy. The monitor system 12 may adjust the user's insurance premium based on its analysis of the user's activity, and the monitor system 12 may store the adjusted insurance premium in the database 28 or any other suitable storage device.

Figure 3:
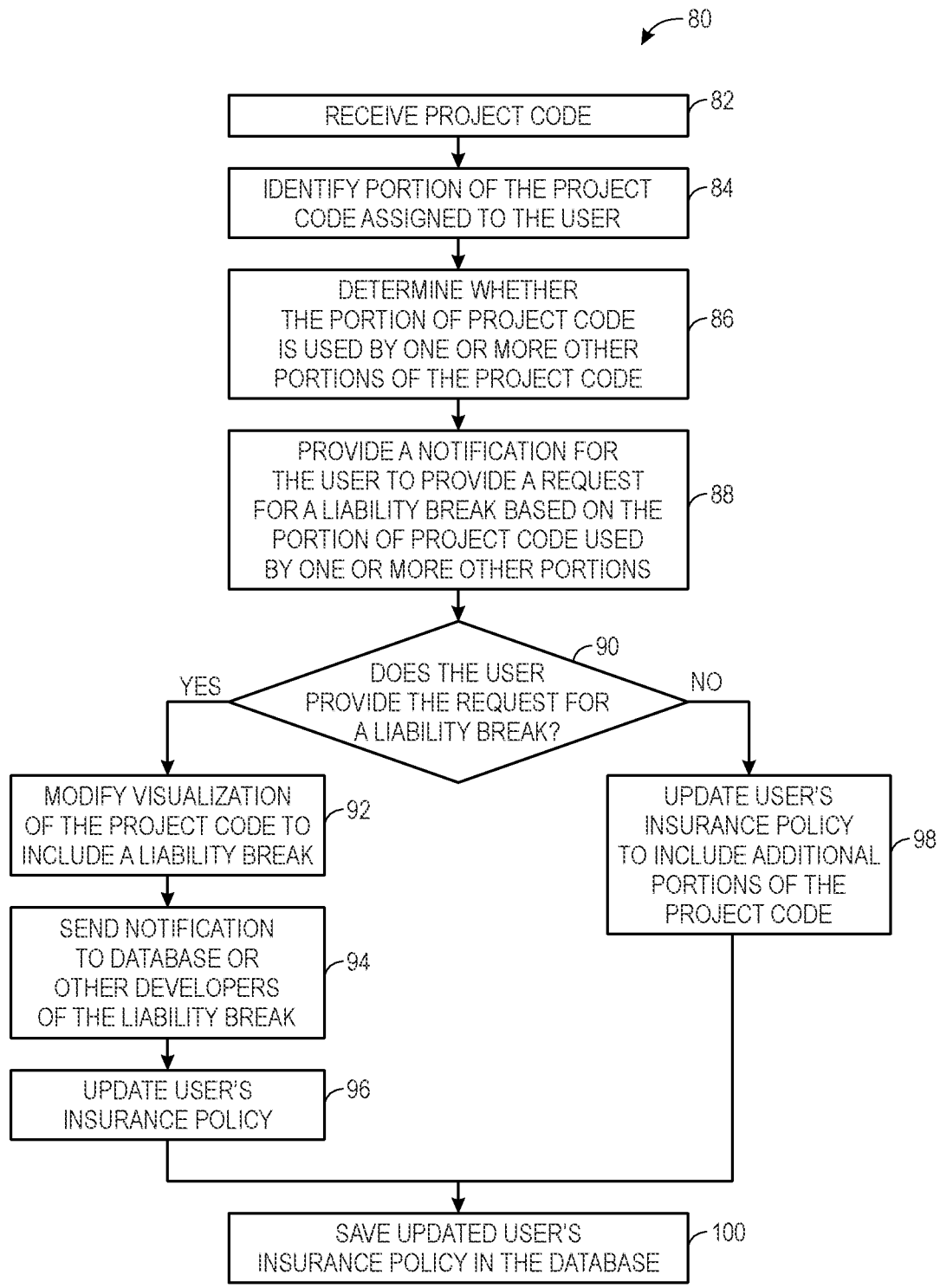
FIG. 3 illustrates a flow chart of a process for updating visualizations for liability notifications based on the user's activity, in accordance with an embodiment described herein.

Turning now to a discussion of providing accurate liability coverage for users, FIG. 3 illustrates a flow chart of a process 80 for updating an insurance premium of a user working on a project based on the user's determined liability. Although the process 80 described in FIG. 3 is detailed in a particular order and as being performed by the monitor system 12, it should be understood that the process 80 may be performed in any suitable order and by any suitable computing device or application.

At block 82, the monitor system 12 may receive project code. In some embodiments, project code may be defined as project files in the format of a programming language file (e.g., Python, C++, C, C#, Java, etc.), a header file, a text file that contains code, or the like. In some embodiments, the monitor system 12 may receive the project code from the user device 30 via the network 10. After receiving the project code, at block 84, the monitor system 12 may identify a portion of project code assigned to the user. In some embodiments, the monitor system 12 may make this identification by monitoring the user's activities in relation to the project code. That is, the monitor system 12 may monitor a part of the code that the user adds, amends, removes, and the like. In some embodiments, the monitor system 12 may retrieve a history of the user's activity from the user device 30, the database 28, or the like. The monitor system 12 may analyze the history of user activity to determine what portion of the code that the user has added, amended, removed, and the like.

After identifying the portion of project code assigned to the user, at block 86, the monitor system 12 may determine whether a portion of the identified project code is used by or affects other portions of the project code. For example, the monitor system 12 may determine if the project code implements user-produced subroutines in areas other than the previously-identified user portions. That is, the monitor system 12 may determine if subroutines that the user has produced (e.g., functions) are called by one or more other portions of the project code. The monitor system 12 may also determine if the identified portion contains code such as global variables, classes, and the like that may affect portions of the project code not developed by the user. In some embodiments, the monitor system 12 may determine if the project code utilizes imported files generated by the user (e.g., header files, text files, etc.).

In some embodiments, the monitor system 12 may determine whether the portion of the identified project code is used by or affects other portions of the project code based on data received from other portions of the project code. That is, if the identified portion of the project code requests data, transmits data, or performs any data transfer, the monitor system 12 may track the data that is received by the identified portion or used by the identified portion via a data transfer layer in response to the function executed by the identified portion. In this way, the traffic of data between portions of code may provide insight into whether the identified portion accesses or uses other portions of the project code. Indeed, in some embodiments, the data received by the identified portion may include metadata or address data indicative of the source or sender of the data. In this way, the monitor system 12 may determine whether the identified portion access other portions of the project code based on the data received by the identified portion.

At block 88, the monitor system 12 may provide a notification for the user that they may request for a liability break based on the identified portion of project code affecting other portions of the project code. In some embodiments, the notification may be sent to the user device 30 via the network 10 and presented to the user via a display or some other suitable component that may receive inputs. The notification may include interactive links or objects that may cause the user device 30 to present the identified portion of the project code, the other portions of the project code affected by the identified portion, and the like to allow the user to review the liability exposure. In some embodiments, the monitor system 12 may provide details in the notification regarding owners of the other portions of the project code, percentages of the entire project code associated with the other portions, and other suitable data related to the scope in which the identified portion of the project code may affect other portions of the project code.

At block 90, the monitor system 12 may determine if the user has requested for a liability break based on an input response provided in response to the notification. That is, the monitor system 12 may receive a selection from the user electing for a liability break or not. In some embodiments, the monitor system 12 may present, in the notification provided in block 88, a recommendation with regard to requesting a liability break. For example, if the identified portion of the code affects or accesses another portion of the project code that accounts for more than a threshold percentage (e.g., 25%) of the entire project code, the monitor system 12 may recommend obtaining a liability break.

On one hand, if the user does request a liability break, the monitor system 12 may proceed to block 92. Here, the monitor system 12 may add or modify visualizations representative of the project code to include a liability break. The liability break may provide the user with liability coverage over damages or issues that may arise from the user's identified code portion. In some embodiments, the monitor system 12 may overlay a highlight over the user's identified code portion. In some embodiments, the monitor system 12 may add a visualization (e.g., a graphic) indicating the liability break in an integrated development environment (IDE), text editor, or the like of the user device 30. In some embodiments, the monitor system 12 may insert comments in the code that indicate the liability break. In some embodiments, the monitor system 12 may add a hyperlink to the added or modified visualization break to a document (e.g., a PDF) detailing information about the liability break.

After modifying the visualization of the project code, the monitor system 12 may then proceed to block 94. Here, the monitor system 12 may send a notification to the database 28 or other users (e.g., other developers working on the project) of the liability break. The notification may detail information about the liability break, such as: information pertaining to the user (e.g., project role), information pertaining to the project, information pertaining to the elected coverage (e.g., what subroutine was covered), and the like. The notification may be sent to other users via the network 10. Furthermore, the notification may be logged in the database 28 or any other suitable device.

At block 96, the monitor system 12 may update the user's insurance policy. The monitor system 12 may take into account factors of the user's identified portion of the project code. For example, the monitor system 12 may factor in: the amount of user-produced code covered by the liability break, the amount of project code that is affected by the user's portion of project code (e.g., via subroutines), and the like. For example, the monitor system 12 may apply a certain percentage increase for each subroutine in the user's code portion used in other sections of the project code. The monitor system 12 may also incorporate information about the user and the project into its adjustment of the user's insurance policy, such as: the user's level of expertise (e.g., years of experience, known programming languages, etc.), education and certifications, role in the project, role in the company (e.g., junior or senior engineer), efficiency related to other, similar projects (e.g., time usually spent by user to complete a project), and the like.

Returning to block 90, if the user elects to not request a liability break, then the monitor system 12 may proceed to block 98. Here, the monitor system 12 may update the user's insurance policy to include additional portions of the project code. In some embodiments, the additional portions of project code may include project code that utilizes user-produced code (e.g., via subroutines). Thus, the updated insurance policy may reflect that the user may be liable for damages caused by the additional portions of project code. After updating the user's insurance policy at either block 96 or block 98, the monitor system 12 may save the updated insurance policy in the database 28 or any other suitable device.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of disclosed embodiments have been illustrated and described herein, many modifications and changes will occur to those skilled in the art. It is, there-fore, to be understood that the appended claims are intended to cover all such modifications and changes as fall within the true spirit of the present disclosure.

The invention claimed is:
1. A method, comprising:
   receiving, via a processor, an indication that a user is performing one or more activities on a project code, wherein the project code corresponds to at least a portion of a software application produced by the user and one or more other users;

receiving, via the processor, an insurance policy associated with the user and the project code in response to receiving the indication;

monitoring, via the processor, the one or more activities performed on the project code by the user, wherein the one or more the activities comprise adding content to the project code, removing additional content from the project code, or both;

determining, via the processor, whether the one or more activities correspond to one or more expected activities associated with the insurance policy;

identifying, via the processor, one or more inconsistent activities performed by the user by determining that at least a portion of the one or more activities being performed corresponds to a portion of the project code restricted from access to the user based on the one or more expected activities associated with the insurance policy; and sending, via the processor, a notification indicative of the one or more inconsistent activities to a user device in response to identifying the one or more inconsistent activities, wherein the notification comprises one or more suggestions for changing the one or more activities to comply with the one or more expected activities based on a machine learning algorithm configured to monitor a plurality of activities associated with a plurality of project codes implemented by a plurality of users over a period of time.

2. The method of claim 1, comprising modifying, via the processor, an insurance premium associated with the insurance policy in response to identifying the one or more inconsistent activities.

3. The method of claim 1, wherein the notification comprises one or more interactive links associated with the one or more suggestions, wherein the one or more interactive links are configured to cause the processor to display one or more portions of the project code associated with the one or more inconsistent activities.

4. The method of claim 1, wherein the insurance policy comprises one or more parameters associated with performing the one or more activities.

5. The method of claim 4, wherein the one or more parameters are associated with one or more comments provided in the project code, an amount of time associated with correcting one or more errors in the project code, one or more test results associated with the project code, one or more lengths of one or more portions of the project code, or any combination thereof.

6. The method of claim 1, wherein the one or more activities are associated with peripheral data, one or more changes to memory, or both.

7. The method of claim 1, wherein the machine learning algorithm is configured to identify one or more changes to cause at least a portion of the plurality of project codes to become compliant with the insurance policy.

8. The method of claim 1, comprising:
receiving, via the processor, one or more updated activities performed on the project code;
determining, via the processor, whether the one or more updated activities correct the one or more inconsistent activities; and
sending, via the processor, an additional notification indicative of one or more inconsistent activities being corrected in response to determining that the one or more activities are corrected.

9. The method of claim 8, wherein the one or more updated activities correspond to the one or more suggestions.

10. A method, comprising:
monitoring, via a processor, one or more activities performed on one or more portions of a project code by a user, wherein the project code corresponds to at least a portion of a software application produced by the user and one or more other users, and wherein the one or more the activities comprise adding content to the project code, removing additional content from the project code, or both;
receiving, via the processor, an insurance policy associated with the user and the project code in response to detecting that the one or more activities;
determining, via the processor, whether the one or more activities correspond to one or more expected activities associated with the insurance policy and the one or more portions of the project code;
identifying, via the processor, one or more inconsistent activities performed by the user by determining that at least a portion of the one or more activities being performed corresponds to a portion of the project code restricted from access to the user based on the one or more expected activities associated with the insurance policy;
determining, via the processor, whether the one or more activities affect one or more other portions different from the one or more portions of the project code;
sending, via the processor, a notification indicative of request for a liability break for the one or more activities to a user device in response to determining that the one or more activities affect the one or more other portions of the project code;
modifying, via the processor, one or more visualizations associated with the one or more portions to include information related to the liability break; and
sending, via the processor, an additional notification indicative of the one or more inconsistent activities to the user device in response to identifying the one or more inconsistent activities, wherein the additional notification comprises one or more suggestions for changing the one or more activities to comply with the one or more expected activities based on a machine learning algorithm configured to monitor a plurality of activities associated with a plurality of project codes implemented by a plurality of users over a period of time.

11. The method of claim 10, comprising sending a third notification indicative of the liability break to a database.

12. The method of claim 10, wherein determining whether the one or more activities affect the one or more other portions different from the one or more portions of the project code comprises determining one or more sizes of the one or more portions relative to one or more other sizes of the one or more other portions.

13. The method of claim 10, wherein the notification comprises one or more interactive links configured to cause the user device to display a visualization of the request, wherein the one or more interactive links are configured to enable the user to accept or reject the liability break.

14. A non-transitory computer-readable medium comprising computer-executable instructions that, when executed, are configured to cause at least one processor to perform operations comprising:
receiving an indication that a user is performing one or more activities on a project code, wherein the project code corresponds to at least a portion of a software application produced by the user and one or more other users;

receiving an insurance policy associated with the user and the project code in response to receiving the indication;

monitoring the one or more activities performed on the project code by the user, wherein the one or more activities comprise adding content to the project code, removing additional content from the project code, or both;

determining whether the one or more activities correspond to one or more expected activities associated with the insurance policy;

identifying one or more inconsistent activities performed by the user by determining at least a portion of the one or more activities being performed corresponds to a portion of the project code restricted from access to the user based on the one or more expected activities associated with the insurance policy; and sending a notification indicative of the one or more inconsistent activities to a user device in response to identifying the one or more inconsistent activities, wherein the notification comprises one or more suggestions for changing the one or more activities to comply with the one or more expected activities based on a machine learning algorithm configured to monitor a plurality of activities associated with a plurality of project codes implemented by a plurality of users over a period of time.

15. The non-transitory computer-readable medium of claim 14, comprising modifying, via the processor, an insurance premium associated with the insurance policy in response to identifying the one or more inconsistent activities.

16. The non-transitory computer-readable medium of claim 14, wherein the operations comprise:

determining whether the one or more activities being performed on one or more portions of the project code affect one or more other portions different from the one or more portions of the project code;

sending an additional notification indicative of request for a liability break for the or more activities to a user device in response to determining that the one or more activities affect one or more other portions of the project code; and modifying one or more additional visualizations associated with the one or more portions to include information related to the liability break.

17. The non-transitory computer-readable medium of claim 16, wherein the additional notification comprises one or more interactive links configured to cause the processor to display a visualization of the request, wherein the one or more interactive links are configured to enable the user to accept or reject the liability break.

18. The non-transitory computer-readable medium of claim 14, wherein the notification comprises one or more interactive links comprising the one or more suggestions for changing the one or more inconsistent activities, wherein the one or more interactive links are configured to cause the processor to display one or more portions of the project code associated with the one or more inconsistent activities.

19. The non-transitory computer-readable medium of claim 14, wherein the one or more activities are associated with peripheral data, one or more changes to memory, or both.

20. The non-transitory computer-readable medium of claim 14, wherein the machine learning algorithm is configured to identify one or more changes to cause at least a portion of the plurality of project codes to become compliant with the insurance policy.

* * * * *